D. B. RYAN.
MILK DISPENSING APPARATUS.
APPLICATION FILED DEC. 20, 1918.
1,317,594.
Patented Sept. 30, 1919.
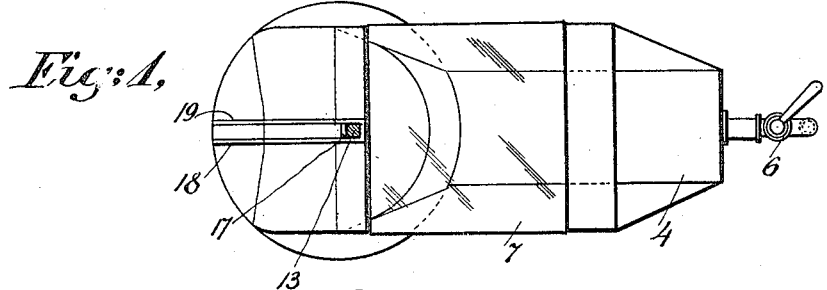
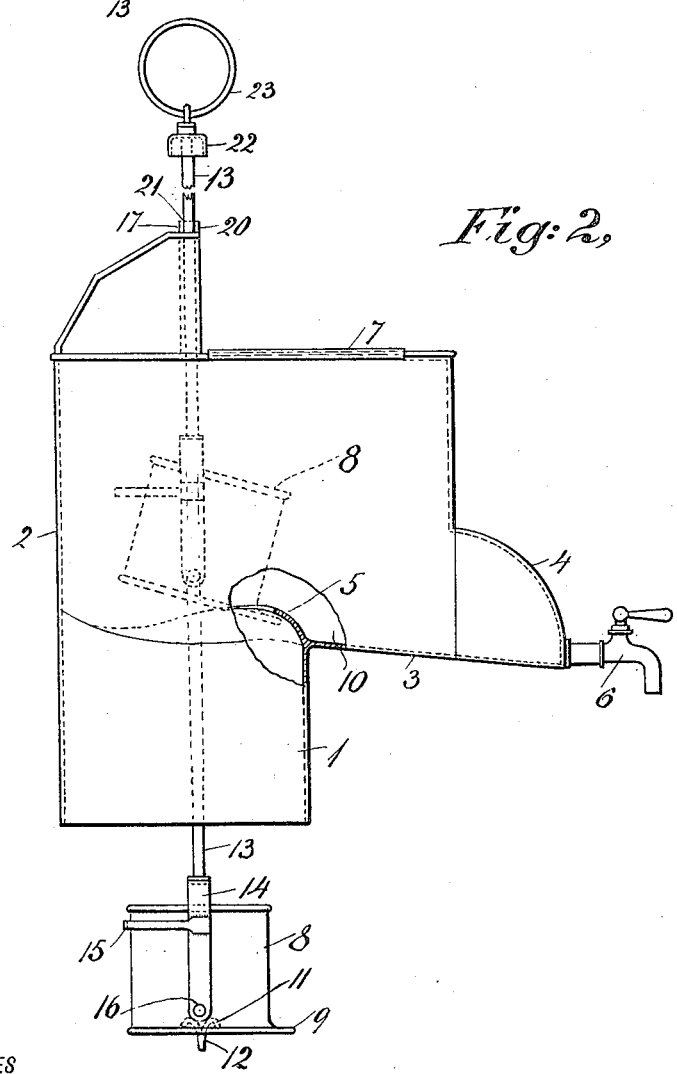
WITNESSES
INVENTOR
Daniel B. Ryan
BY
ATTORNEYS

UNITED STATES PATENT OFFICE.

DANIEL B. RYAN, OF NEW YORK, N. Y.

MILK-DISPENSING APPARATUS.

1,317,594.  Specification of Letters Patent.  Patented Sept. 30, 1919.

Application filed December 20, 1918. Serial No. 267,673.

*To all whom it may concern:*

Be it known that I, DANIEL B. RYAN, a citizen of the United States, and a resident of the city of New York, borough of the Bronx, in the county of the Bronx and State of New York, have invented a new and Improved Milk - Dispensing Apparatus, of which the following is a full, clear, and exact description.

This invention relates to measuring and dispensing devices and has for an object the provision of an improved construction for simultaneously measuring and dispensing milk in a sanitary manner with minimum effort.

Another object of the invention is to provide a vending device for milk which will act as a stirring device as well as a vending device.

A still further object of the invention is to provide a vending device for milk in which the vended milk may be discharged at substantially one time or in small quantities.

In the accompanying drawing:

Figure 1 is a top plan view with certain parts broken away disclosing an embodiment of the invention.

Fig. 2 is a side view of the device shown in Fig. 1, certain parts being broken away to show the operation of the vending or dispensing bucket.

Referring to the accompanying drawing by numerals, 1 indicates a tubular body adapted to be shaped to fit into the top of a milk can in a rather snug manner, though capable of removal when pulled. The tubular body 1 merges into what may be termed a casing 2 formed with a forwardly extending bottom 3, a projecting portion 4 and a deflecting web 5. The deflecting member 5 projects above the bottom 3 so that the side walls of the casing 2 bottom 3 and projection 4 form an outlet chamber which discharges through the spigot or valve 6. At the top of the casing 2 a glass panel 7 is provided which will permit the interior of the casing 2 to be observed and in order that any one may watch the operation of the vending bucket 8. This bucket may be of any size, as for instance one quart, and is provided with an extension 9 adapted to strike against the web 5 when raised to a certain point, whereby the bucket will be dumped and the milk discharged into the chamber or hopper 10 from which it may be immediately discharged from the spigot 6 at one time or may be discharged intermittently by the proper operation of the spigot 6 so as to fill a number of glasses or other receptacles. The bucket 8 is provided with a pressure actuated valve 11 and a projection 12 which is designed to strike the bottom of the milk can when the milk therein is at a low level whereby the milk will pass into the bucket 8 from the bottom, though ordinarily it passes in through the top. The bucket 8 is connected to a rod 13 by means of a U-shaped bail 14 pivotally mounted on the bucket 8 near the bottom, said bail having an arc-shaped bracing member 15 against which the bucket 8 rests except when the extension 9 strikes the web 5. In order to insure this action the pivotal point 16 may be offset slightly toward the extension 9, though ordinarily this is not necessary. The rod 13 may be of any length and extends upwardly through the casing 2 through what may be termed a tube 17 formed by the bracing members 18 and 19 which are soldered or otherwise secured to the top of casing 2, said bracing members being merely a piece of sheet metal bent U-shaped and secured in place. A projection 20 extends from the members 18 and 19 and a separate piece 21 is soldered or otherwise secured to the members 18 and 19 for completing what is termed the tube 17. This tube is preferably square and rod 13 is also preferably square whereby the parts are prevented any accidental rotation. Arranged at the upper end of the rod is a cup-shaped member 22 which is adapted to fit over the upper ends of members 20 and 21 when the device is not being used so as to prevent any dirt or dust passing into the casing 2 and from thence into the milk. A ring 23 is connected in any suitable manner with the rod 13 whereby the rod may be raised and lowered as desired. This rod is of sufficient length to allow the bottom of the bucket 8 to contact with the bottom of the can.

In operation, when a quantity of milk is desired, for instance one quart, the rod 13 together with the bucket 8 is forced downwardly into the milk, if not already therein, and then raised. This action will cause an agitation of the milk and a proper mixing of the milk and cream so as to give a proper grade of milk. The bucket 8 in discharging is raised until the projection 9 strikes the web 5 and the bucket is turned sufficiently to produce a complete discharge. The milk discharged from the bucket 8 will, of course, enter the chamber 10 and by reason of the projection 4 there will be no splashing against the window or glass 7. By also discharging the milk into this chamber it may be drawn off at one time or drawn off in small quantities. This construction and arrangement secures the advantages of the old fashioned dipping method, while at the same time presenting a very sanitary construction. It is, of course, evident that when one can is emptied or almost emptied the device may be quickly and easily removed and placed on another can and so on as long as the milk is to be vended.

What I claim is:

A vending device for milk comprising a sheet metal casing having a tubular bottom section adapted to fit into the neck of a milk can, and a hollow body merging into a discharge chamber, a container having a projection on one end, a U-shaped bail pivotally connected with the container near the bottom edge, a semi-circular member fixed on the arms of the bail for normally preventing the tilting of the container, an operating rod square in cross-section for lifting said container, a square bearing in which the rod is slidingly mounted, said rod normally extending through said casing near the upper part thereof, and a stop projecting from said chamber into the path of movement of said projection for dumping the container as it is raised by said operating rod whereby the contents will be discharged into said discharge chamber.

DANIEL B. RYAN.

Witnesses:
FRANCIS P. NUGENT,
GEORGE A. GRANNELL.

Copies of this patent may be obtained for five cents each, by addressing the "Commissioner of Patents, Washington, D. C."